June 28, 1960 A. G. ANDERSON 2,943,264
PULSE RESHAPER
Filed May 24, 1955

*INVENTOR.*
ARTHUR G. ANDERSON
*BY*
Albert R. Hodges
ATTORNEY

United States Patent Office 2,943,264
Patented June 28, 1960

2,943,264

PULSE RESHAPER

Arthur G. Anderson, New York, N.Y., assignor to International Business Machines Corporation, New York, N.Y., a corporation of New York Filed May 24, 1955, Ser. No. 510,804

1 Claim. (Cl. 328—164)

Figure 1:
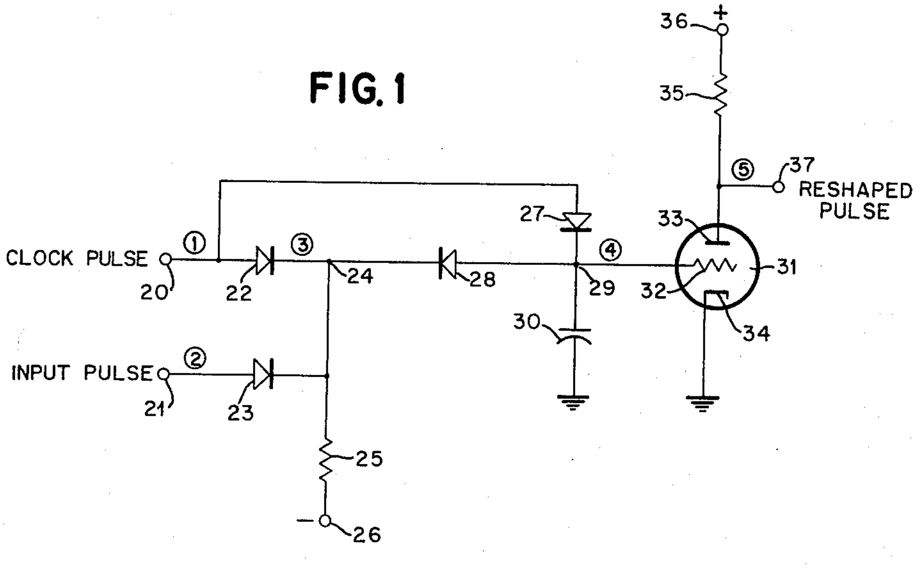

The present invention relates to pulse reshapers, and more particularly to such devices for use at extremely high speeds. Accordingly, the pulse reshaper of the present invention is especially well adapted for use in the millimicrosecond range, that is, a range in which time intervals lying between $10^{-6}$ and $10^{-10}$ second are of interest.

The principal object of the present invention is the provision of a new, less complex high-speed pulse reshaper.

Another object of the present invention is to provide a pulse reshaper which redefines both the width and the start time of the input pulse, as well as its amplitude.

A further object is to provide a pulse reshaper utilizing fewer rectifier elements than were required by previously known arrangements.

An additional object of the present invention is to provide a pulse reshaper which has well defined output signal levels.

Still another object of the present invention is to provide a pulse reshaper employing rectifier elements which need not meet the stringent requirements imposed by previously known arrangements.

In accordance with the present invention, there is provided a pulse reshaper which comprises the combination of an AND circuit having a plurality of input terminals and an output terminal, means for applying input or signal pulses to a first of these input terminals and clock pulses to a second input terminal, rectifier means connected in the path between the first input terminal and the output terminal, and a storage element associated with the output terminal. In preferred embodiments of the invention, the storage element may comprise a capacitor or the input capacitance of an electron discharge device. The AND circuit may comprise a rectifier element associated with each of the input terminals, with additional rectifier means connected in the path between the first input terminal and the output terminal.

An additional feature of the present invention is the provision of an electron discharge device associated with the AND circuit in such a manner that the input capacitance of the electron discharge device serves as a storage element and the reshaped output pulses are developed at the anode of the electron discharge device.

If desired, the AND circuit may be of the negative type, the input pulses and the clock pulses negative-going, and the electron discharge device normally conductive, so that the reshaped output pulses developed at the anode are positive-going. By reversing the direction of maximum conductivity of each rectifier element and utilizing a normally nonconductive electron discharge device, on the other hand, the pulse reshaper of the present invention may equally well be made responsive to positive-going input and clock pulses to provide negative-going output pulses.

A pulse reshaper, generally of the type disclosed and claimed herein, finds particular utility in the Very High Frequency Computing Circuit disclosed and claimed in the Robert M. Walker et al. U.S. patent application Serial No. 607,970, filed August 31, 1956, and of common assignee herewith.

Other objects and features of the invention will be pointed out in the following description and claim and illustrated in the accompanying drawing, which disclose by way of example the principle of the invention and the best mode, which has been contemplated, of applying that principle.

Figure 2:
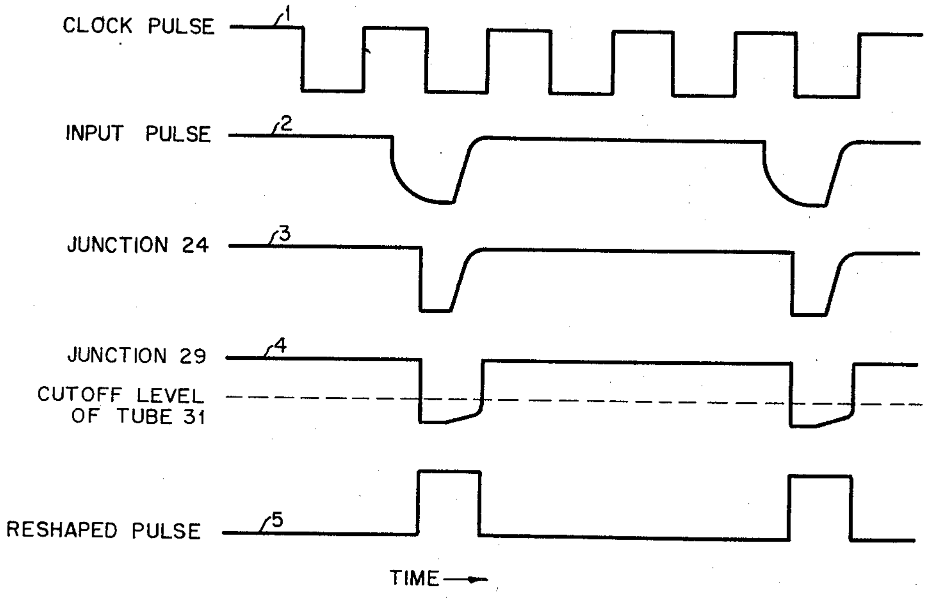

In the drawing:

Fig. 1 is a schematic circuit diagram of a pulse reshaper in accordance with a preferred embodiment of the present invention; and Fig. 2 is a graphic representation, to a common time base, of the approximate waveforms which exist in various portions of the system in Fig. 1, these portions being designated by the encircled reference numerals.

Referring to Fig. 1 of the drawing, there is shown a pulse reshaper in accordance with the present invention and comprising essentially an AND circuit, a storage element and associated apparatus, the resultant combination serving to redefine both the width and the start time in accordance with a separate train of timing or clock pulses, as well as the amplitude, of input pulses.

A pair of input terminals 20 and 21 are provided, clock pulses being applied to terminal 20 and input or signal pulses to terminal 21. A pair of rectifier elements 22 and 23, connected respectively to input terminals 20 and 21, have their common junction 24 connected through a resistor 25 to a suitable source 26 of negative potential. Rectifier elements 22 and 23, together with resistor 25, may be considered as comprising a negative AND circuit having input terminals 20 and 21, junction 24 effectively serving as its output terminal.

A pair of rectifier elements 27 and 28 are connected in series between input terminal 20 and junction 24. As shown, rectifier elements 22, 23 and 28 have their maximum conductivity in a direction toward junction 24, whereas that of rectifier element 27 is toward junction 29. Connected between ground and the junction 29 of rectifier elements 27 and 28 is a storage element 30, illustrated in the drawing as a capacitor.

There is also provided an electron discharge device 31 having a control electrode 32, an anode 33 and a cathode 34. The latter element is preferably grounded as shown. Control electrode 32 is connected to junction 29. Anode 33 is connected through a load resistor 35 to a source 36 of positive potential. Also connected to anode 33 is an output terminal 37.

The waveform of the negative-going clock pulses applied to input terminal 20 is represented by curve 1 of Fig. 2. Curve 2 of Fig. 2 indicates the approximate waveform of the negative-going input or signal pulses applied to input terminal 21. The approximate waveforms developed respectively at junctions 24 and 29 are shown by curves 3 and 4 of Fig. 2. Curve 5 of Fig. 2 is an approximate representation of the reshaped output pulses which are developed at output terminal 37.

In operation, let it be assumed that electron discharge device 31 is normally conductive. When a negative-going input pulse (curve 2) applied to input terminal 21 coincides with a negative-going clock pulse (curve 1) applied to input terminal 20, the potential of junction 24 falls, due to the operation of the AND circuit comprising rectifier elements 22 and 23 together with resistor 25. This potential fall of junction 24, as depicted by curve 3, causes the potential of junction 29 also to fall, due to the presence of rectifier element 28. This in turn renders electron discharge device 31 non-conductive, so that the potential of anode 33 rises, thus initiating an output pulse at output terminal 37, as indicated by curve 5.

When the potential at input terminal 21 returns to its normal value, due to the fall of the signal pulse, junction 24 returns to its normal value, as shown by curve 3. Junction 29, however, remains down at substantially its lowest potential, due to the charge now on storage element 30 and to the presence of rectifier element 28. Shortly thereafter, the potential at input terminal 20 rises with the rise of the clock pulse, as shown by curve 1. Due to the action of rectifier element 27, this rise in potential of terminal 20 causes junction 29 to return immediately to its normal value, as shown by curve 4, thus restoring the conductivity of electron discharge device 31. This in turn lowers the potential of anode 33 and terminates the output pulse developed at output terminal 37, as shown by curve 5. In the meantime, between the time at which junction 24 rises and the time at which junction 29 returns to its initial value, storage element 30 begins to discharge through the back resistance of rectifier element 28. This has no effect on the potential at output terminal 37, however, since the potential of junction 29 remains well below the cutoff level of the electron discharge device 31, as clearly illustrated by curve 4 of Fig. 2.

Storage element 30 is illustrated in Fig. 1 as a capacitor. However it is to be appreciated that, in some cases, the input capacitance of electron discharge device 31 may by itself serve adequately as the storage element. It will be understood, of course, that this input capacitance may be supplemented if necessary by additional capacitance connected between junction 29 and ground.

One of the important features of the embodiment of the invention which is shown in Fig. 1, that is, with negative-going input and clock pulses and a normally conductive electron discharge device, is that the output levels are very precisely defined. If desired, however, the arrangement of Fig. 1 may readily be modified without departing from the scope of the present invention for the utilization of positive-going clock and input signal pulses merely by reversing the polarity of each of the rectifier elements and by arranging electron discharge device 31 to be normally nonconductive. Such a modified arrangement has the advantage of somewhat less stringent requirements for rectifier elements 22, 23, 27 and 28.

The arrangement of Fig. 1 may also be modified, again without departing from the scope of the present invention, by the omission of rectifier element 22. It will be readily apparent to those skilled in the art that the resultant structure is the functional equivalent of that shown in Fig. 1 and described above. In this case, rectifier elements 27 and 28 in series, in addition to performing the functions described above, serve also as a substitute for rectifier element 22. This particular modification is especially appropriate when rectifier elements are employed which have a relatively high ratio of back-to-forward resistance.

It will be readily understood that electron discharge device 31 may be omitted entirely if desired. In this case, storage element 30 comprises a suitable capacitor and junction 29 becomes the output terminal of the device as a whole. The output pulses developed at terminal 29 may be reversed in polarity from those shown by curve 4, if desired, by the use of a pulse transformer or any other suitable type of inverter. It is assumed that the input impedance of the utilization device connected to junction 29 is relatively high, so that it has no appreciable effect upon storage element 30. Otherwise, this load impedance must be taken into consideration in selecting the value of element 30.

In one embodiment of the present invention which was specifically designed for operation in, and which successfully operated in, a system employing a pulse width of approximately 10 millimicroseconds and a repetition rate at least as high as 10 megacycles per second, the following constants and components were utilized:

| | |
|---|---|
| Rectifier elements **22**, **23**, **27** and **28** | Type 1N60. |
| Resistor **25** | 7,500 ohms. |
| Resistor **35** | 220 ohms. |
| Storage element **30** | 10 micromicrofarads. |
| Electron discharge device **31** | Type W.E. 417-A. |
| Potential source **26** | −150 volts. |
| Potential source **36** | +150 volts. |

While there have been shown and described and pointed out the fundamental novel features of the invention as applied to a preferred embodiment, it will be understood that various omissions and substitutions and changes in the form and details of the device illustrated and in its operation may be made by those skilled in the art without departing from the spirit of the invention. It is the intention, therefore, to be limited only as indicated by the scope of the following claim.

What is claimed is:

A pulse reshaper, said pulse reshaper consisting in combination of: a first input terminal; a second input terminal; means for applying clock pulses to said first input terminal; means for applying input pulses to said second input terminal; an electron discharge device having a grid, an anode and a cathode; a source of positive potential; a resistor connected between said source of positive potential and said anode of said electron discharge device; a direct connection between said cathode of said electron discharge device and a source of reference potential; a capacitor connected between said grid and said cathode of said electron discharge device; a first diode having its anode connected to said first input terminal and its cathode connected to said grid of said electron discharge device; a second diode having its anode connected to said first input terminal and having a cathode; a third diode having its anode connected to said grid of said electron discharge device and its cathode connected to said cathode of said second diode; a fourth diode having its anode connected to said second input terminal and its cathode connected to the junction of the cathodes of said second and third diodes; a source of negative potential; a resistor connected between said source of negative potential and the junction of the cathodes of said second, third and fourth diodes; whereby the capacitance of said capacitor and the input capacitance of said electron discharge device serve as a storage element and said input pulses are respectively manifested by accurately shaped output pulses appearing at the anode of said electron discharge device.

References Cited in the file of this patent

UNITED STATES PATENTS

| | | |
|---|---|---|
| 2,646,501 | Eckert et al. | July 21, 1953 |
| 2,712,065 | Elbourn et al. | June 28, 1955 |
| 2,765,115 | Belougie | Oct. 2, 1956 |
| 2,884,521 | Eckert | Apr. 28, 1959 |

OTHER REFERENCES

Pro. I.R.E., May 1950, pages 511–514, "Diode Coincidence and Mixing Circuits in Digital Computers," Chen.